United States Patent
Youn

(10) Patent No.: US 8,064,604 B2
(45) Date of Patent: Nov. 22, 2011

(54) METHOD AND APPARATUS FOR FACILITATING ROLE-BASED CRYPTOGRAPHIC KEY MANAGEMENT FOR A DATABASE

(75) Inventor: Paul Youn, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 935 days.

(21) Appl. No.: 11/651,283

(22) Filed: Jan. 9, 2007

(65) Prior Publication Data

US 2007/0230706 A1    Oct. 4, 2007

(51) Int. Cl.
*H04L 9/00* (2006.01)

(52) U.S. Cl. .......................................... 380/277; 705/71
(58) Field of Classification Search .............. 380/277; 705/71

See application file for complete search history.

(56) References Cited

U.S. PATENT DOCUMENTS

| | | | | |
|---|---|---|---|---|
| 5,202,921 A * | 4/1993 | Herzberg et al. | ............. | 713/162 |
| 5,652,795 A * | 7/1997 | Dillon et al. | .................. | 713/163 |
| 7,093,137 B1 * | 8/2006 | Sato et al. | ...................... | 713/193 |
| 7,181,017 B1 * | 2/2007 | Nagel et al. | .................... | 380/282 |
| 7,406,535 B2 * | 7/2008 | Saulpaugh et al. | ........... | 709/238 |
| 7,543,329 B2 * | 6/2009 | Viets et al. | ........................ | 726/2 |
| 7,904,717 B2 * | 3/2011 | Pilant et al. | .................... | 713/171 |
| 2001/0053222 A1 * | 12/2001 | Wakao et al. | .................... | 380/43 |
| 2002/0031230 A1 * | 3/2002 | Sweet et al. | ................... | 380/278 |
| 2003/0172280 A1 * | 9/2003 | Scheidt et al. | ................. | 713/182 |
| 2003/0229623 A1 * | 12/2003 | Chang et al. | ....................... | 707/3 |
| 2004/0250120 A1 * | 12/2004 | Ng | ................. | 713/201 |
| 2005/0039031 A1 * | 2/2005 | Mont et al. | ...................... | 713/189 |
| 2006/0159270 A1 * | 7/2006 | Urivskiy et al. | ............... | 380/277 |
| 2007/0230706 A1 * | 10/2007 | Youn | ............................. | 380/277 |
| 2007/0297613 A1 * | 12/2007 | Ghosh | ........................... | 380/277 |
| 2008/0010685 A1 * | 1/2008 | Holtzman et al. | ............... | 726/27 |

* cited by examiner

*Primary Examiner* — Beemnet Dada
*Assistant Examiner* — Sayed Beheshti Shirazi
(74) *Attorney, Agent, or Firm* — Shun Yao; Park, Vaughan, Fleming & Dowler LLP

(57) ABSTRACT

One embodiment of the present invention provides a system that facilitates role-based cryptographic key management. The system operates by receiving a request at a database server from a user to perform a cryptographic operation on data on the database server, wherein the user is a member of a role, and wherein the role has been granted permission to perform the cryptographic operation on the data. Next, the system receives from the user at the database server a user key, which is associated with the user. The system then unwraps a wrapped role key with the user key to obtain a role key, which is associated with the role. Next, the system unwraps a wrapped data key with the role key to obtain a data key, which is used to encrypt and decrypt the data. Finally, the system uses the data key to perform the cryptographic operation on the data.

19 Claims, 5 Drawing Sheets

COMPUTING ENVIRONMENT 100

{DATA1}$_{CK1}$    {CK1}$_{ROLE1PK}$    {ROLE1SK, ROLE1PK}$_{User1Secret}$

{DATA2}$_{CK2}$    {CK2}$_{ROLE1PK}$    {ROLE1SK, ROLE1PK}$_{User2Secret}$

{CK2}$_{User1Secret}$

FIG. 4

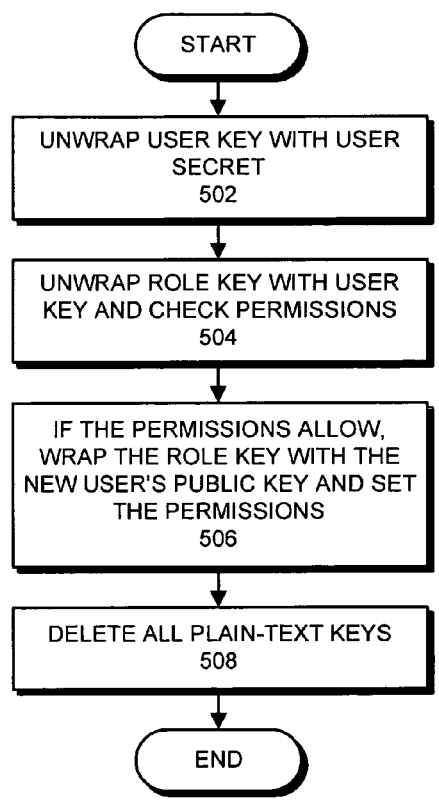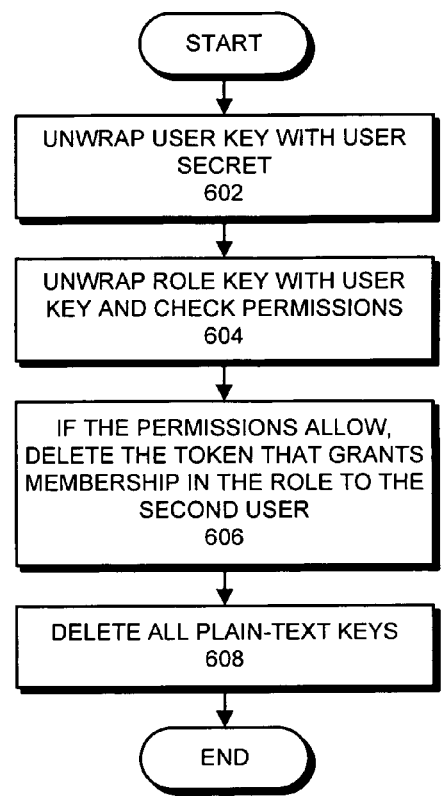
FIG. 5
FIG. 6

METHOD AND APPARATUS FOR FACILITATING ROLE-BASED CRYPTOGRAPHIC KEY MANAGEMENT FOR A DATABASE

RELATED APPLICATION

This application is related to U.S. patent application Ser. No. 11/398,187, entitled "METHOD AND APPARATUS FOR MANAGING CRYPTOGRAPHIC KEYS," by inventors Paul Youn and Daniel ManHung Wong, filed on 4 Apr. 2006, and is herein incorporated by reference.

BACKGROUND

1. Field of the Invention

The present invention relates to databases. More specifically, the present invention relates to a method and an apparatus for facilitating role-based cryptographic key management for a database.

2. Related Art

Businesses have a vested interest in protecting sensitive information. Customers and clients are generally reluctant to do business with organizations that have a weak record of protecting their data. One existing technique for protecting sensitive data is to encrypt the sensitive data so that only individuals or systems that have the corresponding decryption keys can decrypt the data. However, encryption and decryption operations are computationally expensive, which can create a significant computational burden if large amounts of data are involved. Moreover, more secure encryption/decryption techniques tend to involve expensive, in terms of time and computer resources, encryption and decryption operations.

In cases where this sensitive information is stored in databases that are accessed by many individuals, management of cryptographic keys is extremely problematic. One way to allow many individuals to access sensitive data is to give them all copies of the same encryption/decryption key. However, this is problematic for a number of reasons. If a person is removed from a job where they have access to the data and the encryption/decryption keys, then all of the data must be encrypted with a new key and copies of the new key must be issued to everyone who requires access to the sensitive data. Furthermore, when more copies of the encryption/decryption keys are distributed, it becomes more likely that a copy of one of the keys will fall into the wrong hands.

A better way to secure sensitive data is to issue every user a different encryption/decryption key. As users are granted access to sensitive data, the key that was used to encrypt/decrypt the data (the data key) can then be wrapped with the users' public keys. If a user then wishes to access the data, the user can then unwrap the data key with their private key. Under this technique, revoking a user's access to the data is as simple as removing the copy of the data key that is wrapped with the user's public key.

A major drawback to this encryption/decryption technique is that it does not scale well with a large number of users. In order for an administrator to grant access to a large number of users, the administrator must grant access to each user one at a time. Furthermore, if the data key is ever changed, the new data key must then be rewrapped with a user key for every user who requires access to the data.

Hence, what is needed is a method for maintaining cryptographic keys without the problems described above.

SUMMARY

One embodiment of the present invention provides a system that facilitates role-based cryptographic key management. The system operates by receiving a request at a database server from a user to perform a cryptographic operation on data on the database server, wherein the user is a member of a role, and wherein the role has been granted permission to perform the cryptographic operation on the data. Next, the system receives from the user at the database server a user key, which is associated with the user. The system then unwraps a wrapped role key with the user key to obtain a role key, which is associated with the role. Next, the system unwraps a wrapped data key with the role key to obtain a data key, which is used to encrypt and decrypt the data. Finally, the system uses the data key to perform the cryptographic operation on the data.

In a variation of this embodiment, the system adds a second user to the role by receiving a second user key at the database server, wherein the second user key is associated with the second user. The system then receives a command to add the second user to the role. Finally, in response to the command, the system wraps the role key with the second user key.

In a variation of this embodiment, the second user key is an asymmetric key. Furthermore, the public key portion of the second user key is stored on the database server. In addition, the second user can be added to the role while the second user is offline by using the public key portion of the second user key.

In a further variation, the public key portion of the second user key is protected by one of: a certificate, a digital signature, a server key, or an administrator key.

In a variation of this embodiment, the system grants permission to the role to perform the cryptographic operation on the data upon receiving a command to grant such permission to the role. In response to the command, the system wraps the data key with the role key.

In a variation of this embodiment, the system grants membership in the role to a second role upon receiving a command to grant membership in the role to a second role. In response to the command, the system wraps the role key with a second role key.

In a variation of this embodiment, the role key and the data key are never revealed outside of the database server.

In a variation of this embodiment, the data key is a column key, which is used to perform cryptographic operations on a column, a row, or a cell, within a database.

In a variation of this embodiment, the system removes a user from a role by deleting the wrapped role key that is wrapped with the user key associated with the user.

In a variation of this embodiment, the system revokes a role's ability to perform cryptographic operations on the data by deleting the wrapped data key that is wrapped with the role key associated with the role.

BRIEF DESCRIPTION OF THE FIGURES

FIG. 4 illustrates cryptographic keys with an embodiment of the present invention.

FIG. 5 presents a flowchart illustrating the process of a user granting access to another user in accordance with an embodiment of the present invention.

FIG. 6 presents a flowchart illustrating the process of a user revoking access of another user in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

Figure 1:
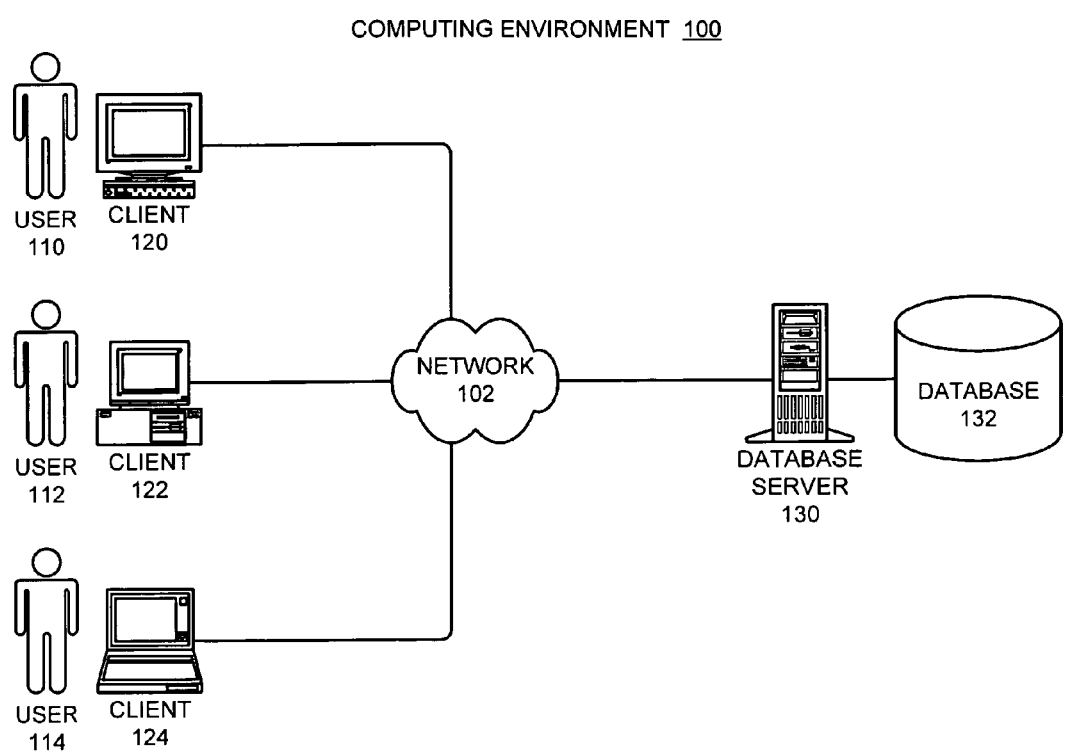
FIG. 1 illustrates a computing environment in accordance with an embodiment of the present invention.

FIG. 1 illustrates a computing environment 100 in accordance with an embodiment of the present invention. Computing environment 100 includes network 102, users 110-114, clients 120-124, database server 130, and database 132.

Network 102 can generally include any type of wired or wireless communication channel capable of coupling together computing nodes. This includes, but is not limited to, a local area network, a wide area network, or a combination of networks. In one embodiment of the present invention, network 102 includes the Internet.

Clients 120-124 can generally include any node on a network including computational capability and including a mechanism for communicating across the network.

Database server 130 can generally include any computational node including a mechanism for servicing requests from a client for computational and/or data storage resources.

Database 132 can include any type of system for storing data in non-volatile storage. This includes, but is not limited to, systems based upon magnetic, optical, and magneto-optical storage devices, as well as storage devices based on flash memory and/or battery-backed up memory.

One embodiment of the present invention provides a system that facilitates role-based cryptographic key management. The system operates by receiving a request at a database server 130 from a user 110 to perform a cryptographic operation on data on the database server 130. In this embodiment, user 110 is a member of a role, and the role has been granted permission to perform the cryptographic operation on the data. Next, the system receives a user key from user 110 at database server 130, wherein the user key is associated with user 110. The system then unwraps a wrapped role key with the user key to obtain a role key, which is associated with the role. Next, the system unwraps a wrapped data key with the role key to obtain a data key, which is used to encrypt and decrypt the data. Finally, the system uses the data key to perform the cryptographic operation on the data.

In a variation of this embodiment, the system adds a second user, user 112 to the role by receiving a second user key at database server 130, wherein the second user key is associated with user 112. The system then receives a command to add user 112 to the role. Finally, in response to the command, the system wraps the role key with the second user key.

In a further variation, the second user key is an asymmetric key. Furthermore, the public key portion of the second user key is stored on database server 130. In addition, user 112 can be added to the role while user 112 is offline by using the public key portion of the second user key. Note that all of the user keys can be asymmetrical key pairs. Also note that the data key may be a symmetric key or an asymmetric key pair.

In a further variation, the public key portion of the second user key is protected by one of: a certificate, a digital signature, a server key, or an administrator key.

In a variation of this embodiment, the system grants permission to the role to perform the cryptographic operation on the data upon receiving a command to grant such permission to the role. In response to the command, the system wraps the data key with the role key.

In a variation of this embodiment, the system grants membership in the role to a second role upon receiving a command to grant membership in the role to a second role. In response to the command, the system wraps the role key with a second role key.

In a variation of this embodiment, the role key and the data key are never revealed outside of the database server.

In a variation of this embodiment, the data key is a column key, which is used to perform cryptographic operations on a column, a row, or a cell, within database 132.

In a variation of this embodiment, the system removes user 114 from a role by deleting the wrapped role key that is wrapped with the user key associated with user 114.

In a variation of this embodiment, the system revokes a role's ability to perform cryptographic operations on the data by deleting the wrapped data key that is wrapped with the role key associated with the role.

In one embodiment of the present invention, the system can leverage any existing key infrastructure, such as a PKI (public key infrastructure), to establish user secrets in a third-party system. This is advantageous because user-secret networks (such as PKI) require a great deal of infrastructure to deal with situations such as lost keys and key recovery. By leveraging an existing framework, the system does not incur the additional overhead of developing such an infrastructure.

In a variation on this embodiment, user secrets are maintained by each user, and all encrypted tokens are stored on the database server, or in a third-party system. In this embodiment, the role and data keys are never revealed to the user. The user always passes his or her user secret to the system and the system retrieves the corresponding tokens and unwraps the corresponding keys.

In a variation of this embodiment, each user maintains their own user secrets, and only encrypted tokens are stored on the database server, or in a third-party system. In this embodiment, the user secret is never revealed to the server. The encrypted tokens are passed to the user and decrypted by the user before being sent to the server. These encrypted tokens can include an encrypted role key, an encrypted data key, or an encrypted user key that is separate from the user secret.

In one embodiment of the present invention, as soon as a key is no longer needed for current operations, the plain-text versions of the key is deleted from memory. If a new action then requires use of the key, it must be obtained again from the token.

In a variation on this embodiment, a timeout value can be assigned to the tokens, specifying the amount of time the key can remain in plain-text format, as well as the length of time the token itself is valid. Note that, the longer the key exists in plain-text format, the more at-risk the key becomes.

Encrypting/Decrypting Data

Figure 2:
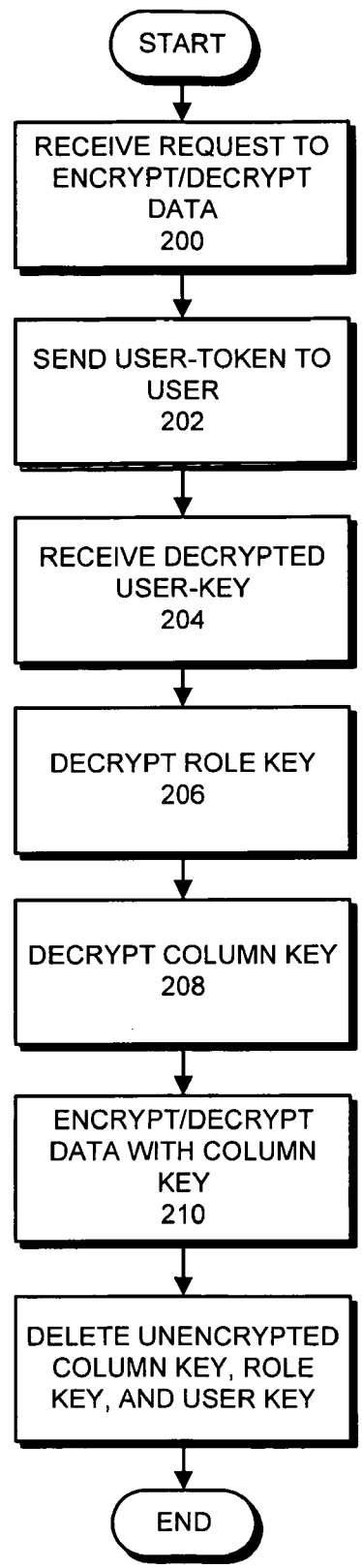
FIG. 2 presents a flowchart illustrating the process of encrypting/decrypting data in accordance with an embodiment of the present invention.

FIG. 2 presents a flowchart illustrating the process of encrypting/decrypting data in accordance with an embodiment of the present invention. The process begins when database 132 receives a request to encrypt/decrypt data from user 112 (step 200). Database 132 then sends the user-token, $\{U_{KEY}\}U_{SECRET}$, to user 112, which enables user 112 to decrypt the user-token (step 202). Next, database 132 receives the decrypted user-key, $U_{KEY}$, from user 112 (step 204). Note that $U_{KEY}$ can be part of an asymmetric key pair or can be a symmetric key. After receiving $U_{KEY}$, database 132 uses $U_{KEY}$ to decrypt the role key, $R_{KEY}$ (step 206). Next, the system uses $R_{KEY}$ to decrypt the column key, $C_{KEY}$ (step 208). The system then uses $C_{KEY}$ to encrypt/decrypt data in database 132 (step 210). Finally, the system deletes the unencrypted versions of $U_{KEY}$, $R_{KEY}$, and $C_{KEY}$ (step 212).

Modifying a Column Key

Figure 3:
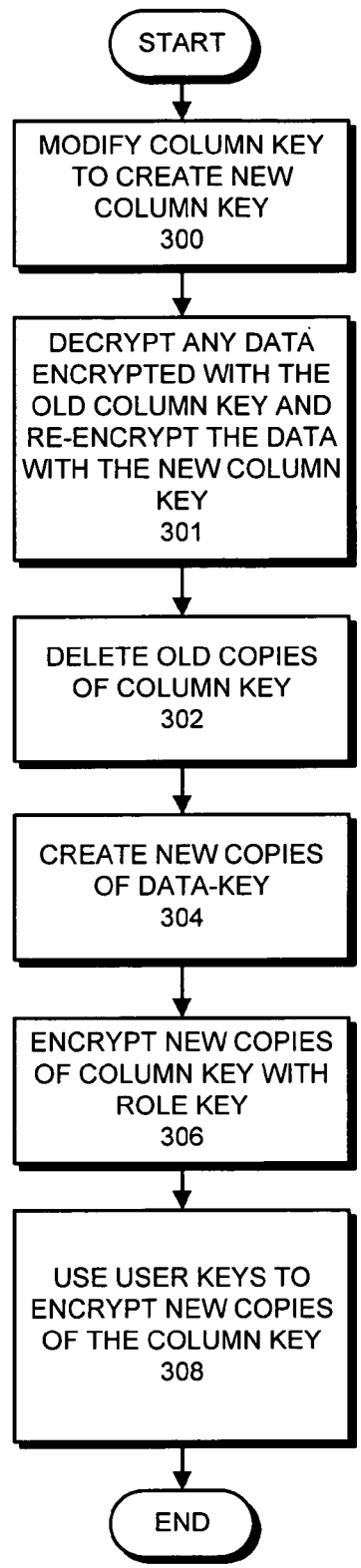
FIG. 3 presents a flowchart illustrating the process of modifying a column key in accordance with an embodiment of the present invention.

FIG. 3 presents a flowchart illustrating the process of modifying a column key in accordance with an embodiment of the present invention. The process begins when user 112, who could be an administrator, or the server acting on user 112's behalf, modifies the column key, $C_{KEY}$, to create a new column key, $C_{KEY2}$ (step 300). Next, database 132 decrypts any data currently encrypted with $C_{KEY}$ and re-encrypts that data with $C_{KEY2}$ (step 301). Then, database 132 deletes all existing copies of the $C_{KEY}$ (step 302). Note that deleting all existing copies of the $C_{KEY}$ includes deleting encrypted copies of the $C_{KEY}$. Database 132 then creates copies of the $C_{KEY2}$ to replace the deleted copies of the $C_{KEY}$ (step 304). Next, database 132 encrypts the copies of the $C_{KEY2}$ with the role keys belonging to the roles whose keys were used to encrypt the copies of the $C_{KEY}$ (step 306). Finally, database 132 encrypts the copies of the token $C_{KEY2}$ with the public portion of the user keys belonging to the users whose keys were used to encrypt the copies of the $C_{KEY}$ (step 308). Note that the public user-key is one-half of a public/private key pair.

Cryptographic Keys

FIG. 4 illustrates cryptographic keys with an embodiment of the present invention. In the example illustrated in FIG. 4, dataset 1 (DATA1) is encrypted with column key 1 (CK1), $\{DATA1\}_{CK1}$, and dataset 2 (DATA 2) is encrypted with column key 2 (CK2), $\{DATA2\}_{CK2}$. Role 1 (ROLE1) can encrypt/decrypt data in both dataset 1 and dataset 2, because of the existence of both $\{CK1\}_{ROLE1PK}$ and $\{CK2\}_{ROLE1PK}$. Note that Role 1 can be a symmetric or an asymmetric key. In addition, user 1 and user 2 are both members of the role, and thus both users can encrypt/decrypt data in dataset 1 and dataset 2. This is made possible by the tokens $\{ROLE1\ SK, ROLE1PK\}_{User1KEY}$ and $\{ROLE1\ SK, ROLE1PK\}_{User2KEY}$. Note that removing user 1 from the role simply involves deleting the $\{ROLE1SK, ROLE1PK\}_{User1KEY}$ token. Furthermore, removing the role from performing cryptographic operations on dataset 2 simply involves removing the $\{CK2\}_{ROLE1PK}$ token.

Note that in some embodiments of the present invention, users may be granted access directly to the data, as well as being granted membership to a role that has access to the data. This is made possible by the token $\{CK2\}_{User1KEY}$, wherein User1 has been granted access to the dataset 2 irrespective of user 1's membership in the role and the role's access to dataset 2.

In one embodiment of the present invention, none of the keys are known outside of database server 130. Only the user secrets are known outside of database server 130. In this embodiment, when the system revokes user 114's access to a role by removing the appropriate token, there is no need to change the role key because user 114 never had the role key. In one embodiment, the tokens are stored on database server 130, while in another embodiment, the tokens are stored at the users' systems and passed to database server 130 when required.

Note that all of the keys in database 132 may also be wrapped with a master key, MK, to facilitate disaster recovery. In one embodiment of the present invention, MK is stored in a Hardware Security Module, HSM, and is never revealed outside of the HSM. In this embodiment, existing tokens are passed to the HSM to be wrapped with the MK, and existing tokens wrapped with the MK are passed to the HSM to be unwrapped.

In one embodiment of the present invention, permissions are stored in each token and wrapped with the appropriate keys. For example, $\{CK1, Permissions\}_{ROLE1PK}$ might contain a read-only permission, wherein the role has read-only permission on dataset 1. Furthermore, permissions can include any database permission and any administrative permission, such as the ability to grant access to the data to a second user.

Note that a role can be a member of another role, and the level of recursion is theoretically infinite. For example, consider the situation where role 1 is a member of role 2, role 2 is a member of role 3, user 1 is a member of role 3, and role 3 has access to data in column 1. In this example, the following tokens would exist on the system: $\{Data\}_{CK1}$, $\{CK1\}_{ROLE1PK}$, $\{ROLE1SK\}_{ROLE2PK}$, $\{ROLE2SK\}_{ROLE3PK}$, $\{ROLE3SK\}_{User1KEY}$.

Granting Permission

FIG. 5 presents a flowchart illustrating the process of user 110 granting membership in the role to user 112 in accordance with an embodiment of the present invention. The system starts when user 110 unwraps his/her user key by presenting his/her user secret to database server 130 (step 502). Note that this step can occur at either the database server 130, or at the client 120 depending on implementation. Next, the system unwraps the role key on behalf of user 110 and checks the permissions (step 504). If the permissions allow user 110 to grant membership in the role to user 112, the system then wraps the role key with user 112's public key and sets applicable permissions (step 506). Note that setting the permissions may be as simple as copying the existing permissions. Furthermore, in one embodiment of the present invention, permissions are not included in the token and permissions are managed through a traditional access control system. Finally, the system deletes all plain-text keys (step 508).

Revoking Permission

FIG. 6 presents a flowchart illustrating the process of a user 110 revoking membership in the role from user 112 in accordance with an embodiment of the present invention. The system starts when user 110 unwraps his/her user key by presenting his/her user secret to database server 130 (step 602). Note that this step can occur at either the database server 130, or at the client 120 depending on implementation. Next, the system unwraps the role key on behalf of user 110 and checks the permissions (step 604). If the permissions allow user 110 to revoke membership in the role from user 112, the system deletes the appropriate token (step 606). Finally, the system deletes all plain-text keys (step 608).

Embodiments of the present invention facilitate granting and revoking access to encrypted data to large numbers of users without the overhead involved in using existing systems. Wholesale changes may be made to groups of users by granting them access to roles, and by simply changing the access of the roles as needed. In addition, because the users never have access to the cryptographic keys themselves, the system can simply delete the appropriate tokens, the users will no longer have access to the data and the role keys and column keys do not need to be modified.

Furthermore, modifying a column key would only require regenerating the tokens for the column key wrapped by the role keys that have access to the data in the column. In this example, only one token would need to be regenerated per role, regardless of the number of users in those roles. In a system that has thousands of users with access to this particular column, this can present tremendous savings.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating role-based cryptographic key management, the method comprising:
  receiving a request at a computer system from a first user to perform a cryptographic operation, wherein the first user is a member of a first role, and the first role is a member of a second role that has been granted permission to perform the cryptographic operation, and wherein a second role key associated with the second role is wrapped with a first role key associated with the first role;
  receiving a user secret to unwrap a first user key associated with the first user;
  using the first user key to unwrap the first role key;
  using the first role key to unwrap the second role key;
  using the second role key to unwrap a data key and a permission, wherein the data key is a column key used to perform cryptographic operations on a column, a row, or a cell, within a database, and wherein the permission specifies cryptographic operations applicable to the second role; and
  responsive to the applicable permission, using the data key to perform the cryptographic operation.

2. The method of claim 1, further comprising adding a second user to the first role by:
  receiving, at the computer system, a second user key associated with the second user;
  receiving a command to add the second user to the first role; and
  in response to the command, wrapping the first role key with the second user key.

3. The method of claim 2, wherein the second user key is an asymmetric key, wherein a public key portion of the second user key is stored on the computer system, and wherein the second user is added to the first role while the second user is offline by using the public key portion of the second user key.

4. The method of claim 3, wherein the public key portion of the second user key is protected by at least one of:
  a certificate;
  a digital signature;
  a server key; and
  an administrator key.

5. The method of claim 1, further comprising granting permission to the first role to perform the cryptographic operation on the data by:
  receiving a command to grant permission to the first role to perform the cryptographic operation on the data; and
  in response to the command, wrapping the data key with the first role key.

6. The method of claim 1, further comprising granting membership in the first role to a third role by:
  receiving a command to grant membership in the first role to the third role; and
  in response to the command, wrapping the first role key with a third role key associated with the third role.

7. The method of claim 1, wherein the first role key and the data key are not revealed outside of the computer system.

8. The method of claim 1, further comprising removing the first user from the first role by deleting the first wrapped role key that is wrapped with the first user key associated with the first user.

9. The method of claim 1, further comprising revoking from the first role ability to perform cryptographic operations on the data by deleting the first wrapped data key that is wrapped with the first role key associated with the first role.

10. A non-transitory computer readable storage medium storing instructions that when executed by a computer cause the computer to perform a method for facilitating role-based cryptographic key management, the method comprising:
  receiving a request at a computer system for a first user to perform a crypto graphic operation, where the first user is member of a first role, and the first role is a member of a second role that has been granted permission to perform the cryptographic operation, and wherein a second role key associated with the second role is wrapped with a first role key associated with the first role;
  receiving a user secret to unwrap a first user key associated with the first user;
  using the first user key to unwrap the first role key;
  using the first role key to unwrap the second role key;
  using the second role key to unwrap a data key and a permission, wherein the data key is a column key used to perform cryptographic operations on a column, a row, or a cell, within a database, and wherein the permission specifies cryptographic operations applicable to the second role; and
  responsive to the applicable permission, using the data key to perform the cryptographic operation.

11. The non-transitory computer-readable storage medium of claim 10, wherein the method further comprises adding a second user to the first role by:
  receiving, at a computer system, a second user key associated with the second user;
  receiving a command to add the second user to the first role; and
  in response to the command, wrapping the first role key with the second user key.

12. The non-transitory computer-readable storage medium of claim 11, wherein the second user key is an asymmetric key, wherein a public key portion of the second user key is stored on the computer system, and wherein the second user is added to the first role while the second user is offline by using the public key portion of the second user key.

13. The non-transitory computer-readable storage medium of claim 12, wherein the public key portion of the second user key is protected by at least one of:
  a certificate;
  a digital signature;
  a server key; and
  an administrator key.

14. The non-transitory computer-readable storage medium of claim 10, wherein the method further comprises granting permission to the first role to perform the cryptographic operation on the data by:
  receiving a command to grant permission to the first role to perform the cryptographic operation on the data; and in response to the command, wrapping the data key with the first role key.

15. The non-transitory computer-readable storage medium of claim 10, wherein the method further comprises granting membership in the first role to a third role by:
   receiving a command to grant membership in the first role to the third role; and
   in response to the command, wrapping the first role key with a third role key associated with the third role.

16. The non-transitory computer-readable storage medium of claim 10, wherein the first role key and the data key are not revealed outside of the computer system.

17. The non-transitory computer-readable storage medium of claim 10, wherein the method further comprises removing the first user from the first role by deleting the first wrapped role key that is wrapped with the first user key associated with the first user.

18. The non-transitory computer-readable storage medium of claim 10, wherein the method further comprises revoking from the first role ability to perform cryptographic operations on the data by deleting the first wrapped data key that is wrapped with the first role key associated with the first role.

19. An apparatus configured to facilitate role based cryptographic key management, comprising:
   A processor;
   A receiving mechanism coupled to the processor and configured to receive a request from a user to perform a cryptographic operation on data at a computer system, wherein the user is a member of a first role, and the first role is a member of a second role that, role has been granted permission to perform the cryptographic operation, and wherein a second role key associated with the second role is wrapped with a first role key associated with the first role;
   wherein the receiving mechanism is further configured to receive from the user a user secret to unwrap a first user key associated with the first user;
   a cryptographic mechanism configured to use the first user key to unwrap the first role key;
   wherein cryptographic mechanism is further configured to use the first role key to unwrap the second role key;
   wherein cryptographic mechanism is further configured to use second role key to unwrap a data key and a permission, wherein the data key is a column key used to perform cryptographic operations on a column, a row, or a cell, within a database, and wherein the permission specifies cryptographic operations applicable to the second role; and
   wherein cryptographic mechanism is further configured to use the data key to perform the cryptographic operation responsive to the applicable permission.

* * * * *